United States Patent
Naylor et al.

(10) Patent No.: US 10,737,970 B2
(45) Date of Patent: Aug. 11, 2020

(54) LOW IRON, HIGH REDOX RATIO, AND HIGH IRON, HIGH REDOX RATIO, SODA-LIME-SILICA GLASSES AND METHODS OF MAKING SAME

(71) Applicant: Vitro Flat Glass LLC, Cheswick, PA (US)

(72) Inventors: Mark O. Naylor, Pittsburgh, PA (US); Lawrence E. Jansen, Burkburnett, TX (US); Larry J. Shelestak, Bairdford, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 0 days.

(21) Appl. No.: 15/046,938

(22) Filed: Feb. 18, 2016

(65) Prior Publication Data

US 2016/0159680 A1 Jun. 9, 2016

Related U.S. Application Data

(62) Division of application No. 14/252,206, filed on Apr. 14, 2014, now abandoned.

(60) Provisional application No. 61/812,006, filed on Apr. 15, 2013.

(51) Int. Cl.
| | |
|---|---|
| *C03C 3/087* | (2006.01) |
| *C03C 4/02* | (2006.01) |
| *C03B 18/12* | (2006.01) |
| *C03C 4/00* | (2006.01) |
| *C03C 3/095* | (2006.01) |

(52) U.S. Cl.
CPC .............. *C03C 3/087* (2013.01); *C03B 18/12* (2013.01); *C03C 3/095* (2013.01); *C03C 4/0092* (2013.01); *C03C 4/02* (2013.01)

(58) Field of Classification Search
CPC .......... C03C 3/087; C03C 4/0092; C03C 4/02
See application file for complete search history.

(56) References Cited

U.S. PATENT DOCUMENTS

| | | | |
|---|---|---|---|
| 3,305,337 A | 2/1967 | Loukes et al. | |
| 3,652,303 A | 3/1972 | Janakirama Rao | |
| 3,779,733 A | 12/1973 | Janakirama-Rao | |
| 4,354,866 A | 10/1982 | Mouly | |
| 4,466,562 A | 8/1984 | DeTorre | |
| 4,604,123 A | 8/1986 | Desprez et al. | |
| 4,671,155 A | 6/1987 | Goldinger | |
| 4,792,536 A * | 12/1988 | Pecoraro | C03B 3/02 501/70 |
| 5,013,487 A | 5/1991 | Cheng | |
| 5,030,594 A | 7/1991 | Heithoff | |
| 5,153,054 A | 10/1992 | Depauw et al. | |
| 5,214,008 A | 5/1993 | Beckwith et al. | |
| 5,344,798 A | 9/1994 | Morimoto et al. | |
| 5,372,977 A | 12/1994 | Mazon-Ramos et al. | |
| 5,674,791 A | 10/1997 | Amundson, Jr. | |
| 5,686,727 A | 11/1997 | Reenstra et al. | |
| 5,723,390 A | 3/1998 | Kijima et al. | |
| 5,817,160 A | 10/1998 | Nagpal et al. | |
| 5,830,812 A | 11/1998 | Shelestak et al. | |
| 5,830,814 A | 11/1998 | Combes | |
| 6,235,666 B1 | 5/2001 | Cochran et al. | |
| RE37,328 E | 8/2001 | Pecoraro et al. | |
| 6,313,053 B1 | 11/2001 | Shelestak | |
| 6,403,509 B2 | 6/2002 | Cochran et al. | |
| 6,673,730 B1 | 1/2004 | Shelestak | |
| 6,737,159 B2 | 5/2004 | Garrett et al. | |
| 6,949,484 B2 | 9/2005 | Landa et al. | |
| 6,962,887 B2 | 11/2005 | Heithoff | |
| 6,995,102 B2 | 2/2006 | Jones et al. | |
| 7,030,047 B2 | 4/2006 | Landa et al. | |
| 7,691,763 B2 | 4/2010 | Arbab et al. | |
| 8,158,543 B2 | 4/2012 | Dejneka et al. | |
| 8,420,928 B2 | 4/2013 | Polcyn | |
| 8,431,502 B2 | 4/2013 | Dejneka et al. | |
| 8,613,806 B2 | 12/2013 | Dorfeld et al. | |
| 8,623,776 B2 | 1/2014 | Dejneka et al. | |
| 2002/0094928 A1* | 7/2002 | Shelestak | C03C 1/00 501/27 |
| 2004/0110624 A1* | 6/2004 | Hulme | C03C 3/087 501/70 |

(Continued)

FOREIGN PATENT DOCUMENTS

| | | | |
|---|---|---|---|
| EP | 1681277 A1 | 7/2006 | |
| EP | 2000440 A2 * | 12/2008 | ........... C03B 5/2252 |
| JP | 200395691 A | 4/2003 | |
| SU | 1606477 A1 | 11/1990 | |
| WO | 0117920 A1 | 3/2001 | |
| WO | 2015072939 A1 | 5/2015 | |

OTHER PUBLICATIONS

Heide et al., "Tin in float glass: A diffusion-reaction model based on surface analysis explains the tin hump," Advances in Fusion & Processing of Glass, 2000, pp. 321-330.
Stella et al., "EPMA Analysis of Float Glass Surfaces", Mikrochimica Acta, 1994, pp. 475-480, vol. 114-115.

*Primary Examiner* — Elizabeth A. Bolden
(74) *Attorney, Agent, or Firm* — The Webb Law Firm

(57) ABSTRACT

A glass has a basic soda-lime-silica glass portion, and a colorant portion including total iron as $Fe_2O_3$ in the range of greater than zero to 0.10 weight percent, e.g. selected from the group of total iron as $Fe_2O_3$ in the range of greater than zero to 0.02 weight percent and total iron as $Fe_2O_3$ in the range of greater than 0.02 weight percent to less than 0.10 weight percent; redox ratio in the range of 0.2 to 0.6, and tin and/or tin compounds, e.g. $SnO_2$ greater than 0.000 to 5.0 weight percent. In one embodiment of the invention, the glass has a tin side and an opposite air side, wherein the tin side of the glass is supported on a molten tin bath during forming of the glass. The tin concentration at the tin side of the glass is greater than, less than, or equal to the tin concentration in "body portion" of the glass. The "body portion" of the glass extending from the air side of the glass toward the tin side and terminating short of the tin side of the glass.

12 Claims, 6 Drawing Sheets

(56) References Cited

U.S. PATENT DOCUMENTS

| | | |
|---|---|---|
| 2004/0152579 A1 | 8/2004 | Ishiki et al. |
| 2004/0229744 A1* | 11/2004 | Heithoff ................ C03B 5/2353 |
| | | 501/72 |
| 2005/0014627 A1* | 1/2005 | Jones ...................... C03C 3/087 |
| | | 501/71 |
| 2005/0209083 A1* | 9/2005 | Takagi ...................... C03B 5/16 |
| | | 501/11 |
| 2007/0209698 A1* | 9/2007 | Thomsen ................ C03C 3/087 |
| | | 136/259 |
| 2010/0038014 A1 | 2/2010 | Tomeno et al. |
| 2010/0129660 A1 | 5/2010 | Nakayama et al. |
| 2011/0283738 A1 | 11/2011 | Fujisawa et al. |
| 2012/0058880 A1 | 3/2012 | Shelestak |
| 2012/0073326 A1 | 3/2012 | Dorfeld et al. |
| 2012/0137737 A1* | 6/2012 | Sakamoto ............... C03B 3/026 |
| | | 65/66 |
| 2012/0207995 A1* | 8/2012 | Shelestak ................ C03C 3/087 |
| | | 428/220 |
| 2012/0289394 A1 | 11/2012 | Nagai et al. |
| 2014/0309099 A1 | 10/2014 | Naylor et al. |

\* cited by examiner

LOW IRON, HIGH REDOX RATIO, AND HIGH IRON, HIGH REDOX RATIO, SODA-LIME-SILICA GLASSES AND METHODS OF MAKING SAME

CROSS REFERENCE TO RELATED APPLICATIONS

This application is a divisional of U.S. patent application Ser. No. 14/252,206, filed Apr. 14, 2014, now United States Application Publication No. US2014/0309099A1, published on Oct. 16, 2014, which application claims the benefits of U.S. Provisional Patent Application Ser. No. 61/812,006 filed Apr. 15, 2013, and titled "LOW IRON, HIGH REDOX RATIO SODA-LIME-SILICA GLASS AND METHOD OF MAKING SAME". Application Ser. Nos. 14/252,206 and 61/812,006 in their entirety are incorporated herein by reference.

BACKGROUND OF THE INVENTION

1. Field of the Invention

This invention relates generally to iron containing, high redox ratio soda-lime-silica glasses and methods of making same, and more particularly, to low iron, high redox ratio, and high iron, high redox ratio, soda-lime-silica glasses, and methods of making same.

2. Discussion of Available Technology

As is appreciated by those skilled in the art of making soda-lime-silica glass, parameters of interest include, but are not limited to, the redox ratio, and total iron expressed as $Fe_2O_3$. For example and not limiting to the discussion, U.S. Pat. No. 6,962,887, which patent is incorporated herein by reference, discloses a glass having total iron expressed as $Fe_2O_3$ in the range of greater than 0 to 0.02 weight percent ("wt. %") and a redox ratio in the range of 0.2 to 0.6. The glass is aesthetically pleasing and useful, for example, in furniture applications such as tabletops or shelving. Further, this glass is highly transparent when viewed normal to a major surface of the glass but has an aesthetically desirable blue i.e., azure edge color when viewed on edge. Such a glass is sold by PPG Industries, Inc. under the PPG Industries Ohio registered trademark "Starphire".

Another glass of interest in the present discussion is disclosed in U.S. Pat. No. 6,313,053, which patent is incorporated herein by reference. The patent discloses a blue colored glass using a standard soda-lime-silica glass base composition and additionally iron and cobalt, and optionally chromium, as solar radiation absorbing materials and colorants. The blue colored glass has total iron expressed as $Fe_2O_3$ in the range of 0.10 to 1.0 wt. %, and a redox ratio in the range of greater than 0.35 to 0.60. Such a glass is considered for purposes of discussion a high iron, high redox ratio, soda-lime-silica glass. Such a glass is sold by PPG Industries, Inc. under the PPG Industries Ohio registered trademark "Solextra".

The low iron, and high Iron, high redox soda-lime-silica glass compositions can be made in a multi-stage melting and vacuum-assisted refining operation as disclosed in U.S. Pat. Nos. 4,792,536 and 5,030,594, and can be made in a conventional float glass system as disclosed in U.S. Pat. No. 6,962,887. U.S. Pat. Nos. 4,792,536, 5,030,594 and 6,962,887 are hereby Incorporated by reference. The high iron. and low iron, high redox ratio soda-lime-silica glass compositions am generally made in a conventional float glass system using oxyfuel as disclosed in U.S. Pat. Nos. 4,604,123; 6,962,887 and 7,691,763 to obtain or maintain a high redox ratio, and the low iron, high redox glasses can be made using oxyfuel fired furnaces but are preferably made using fuel and air mixtures fired In Siemens type furnaces. U.S. Pat. Nos. 4,604,123; 6,962,887 and 7,691,763 are hereby incorporated by reference. Although the presently available methods for making the glasses disclosed in U.S. Pat. Nos. 4,792,536, 5,030,594, 6,313,053 and 6,962,887 am acceptable; there are limitations. More particularly, the limitations of interest in the present discussion are maintaining the redox ratio of the glasses within a range of 0.2 to 0.6 and preferably within the range of 0.35 to 0.6.

As is appreciated by those skilled in the art, the redox ratio can be increased by additions of sulfur (see incorporated U.S. patents) and carbon, e.g. but not limited to graphite, coal and/or oil to reduce the Ferric iron (Fe+++) to Ferrous iron (Fe++). Although presently there are available methods for making glasses having low iron, high redox ratio, and high iron, high redox ratios, it is appreciated by those skilled in the art that the methods are usually tailored to meet the parameters of the furnace. More particularly, the use of carbon to increase the redox ratio of soda-lime-silica glasses made using oxyfuel fired glassmaking furnaces can result in batch melting changes that can result in silica stones. In view of the forgoing, it would be advantageous to provide methods for making low iron and high iron soda-lime-silica glasses having high redox ratios that can be used regardless of the type of heating system or furnace used to melt the glass batch materials and to eliminate the limitations associated with the heating systems.

SUMMARY OF THE INVENTION

The invention relates to a glass having a tin side and an opposite air side, wherein the tin side of the glass is supported on a molten tin bath during forming of the glass. The glass includes, among other things, a basic soda-lime-silica glass portion, and a colorant portion. The colorant portion including, among other things, total iron as $Fe_2O_3$ selected from the group of total iron as $Fe_2O_3$ in the range of greater than zero to 0.10 weight percent; redox ratio in the range of 0.2 to 0.6. The tin and/or tin containing compounds providing tin in an amount within the range of greater than 0.005 to 5.0 weight percent, wherein the tin and/or the tin containing compound provides a concentration of tin in the air side of the glass that is less than the tin in the tin side of the glass.

In non-limiting embodiments off the invention, the total iron as $Fe_2O_3$ is in the range of greater than zero to 0.02 weight percent; or total iron as $Fe_2O_3$ in the range of greater than 0.02 weight percent to 0.10 weight percent.

The invention further relates to a method of making a glass, by, among other things, providing a basic soda-lime-silica glass portion, and a colorant portion. The colorant portion, including, among other things, total iron as $Fe_2O_3$ selected from the group of total iron as $Fe_2O_3$ in the range of greater than zero to 0.02 weight percent; total iron as $Fe_2O_3$ in the range of greater than 0.02 weight percent to less than 0.10 weight percent and total iron as $Fe_2O_3$ in the range of 0.10 to 2.00 weight percent, and tin and/or tin containing compounds providing tin in an amount within the range of greater than 0.005 to 5.0 weight percent, thereafter melting the glass portion and the colorant portion to provide a pool of molten glass; flowing the molten glass onto a molten tin bath; moving the molten glass on the surface of the molten tin bath, while controllably cooling the glass and applying forces to the glass to provide a glass of a desired thickness; and removing the glass from the molten tin bath, wherein the tin and/or tin containing compounds concentration at the tin side of the glass is greater than the Sn concentration in body portion of the glass, the body portion of the glass extending from the air side of the glass and terminating short of the tin side of the glass.

BRIEF DESCRIPTION OF DRAWINGS

FIG. 1A is the melting section of the furnace, and FIG. 1B is the refining and homogenizing section of the furnace.

DETAILED DESCRIPTION OF THE INVENTION

Figure 1:
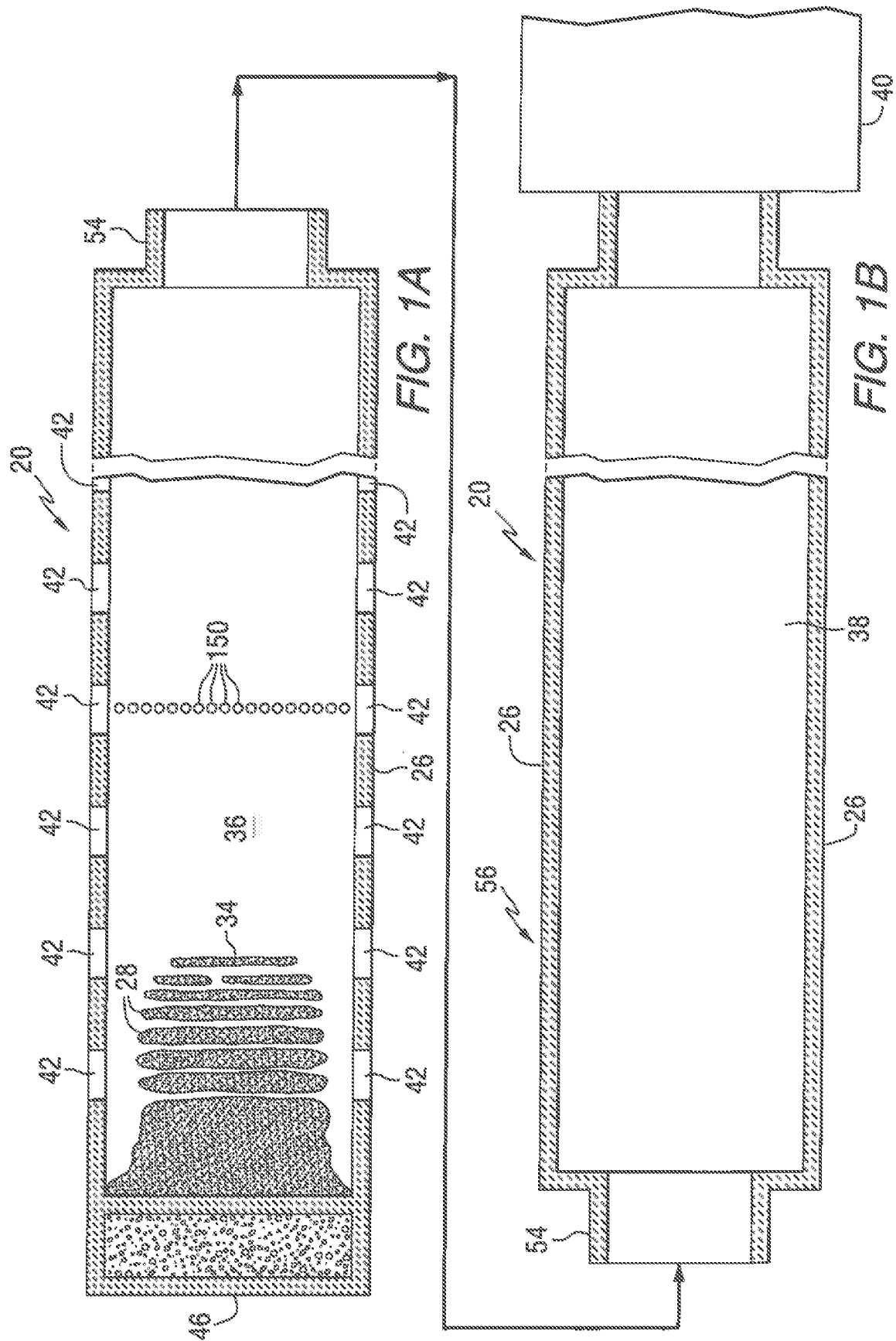
FIGS. 1A and 1B are a horizontal section of a glass melting furnace that can be used in the practice of the invention.

As used in the following discussion, spatial or directional terms, such as "top", "bottom", and the like, relate to the invention as it is shown in the drawing figures. However, it is to be understood that the invention can assume various alternative orientations and, accordingly, such terms are not to be considered as limiting. Unless otherwise indicated, all numbers expressing dimensions, physical characteristics, quantities of ingredients, reaction conditions, and so forth used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to include the beginning and ending range values and to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Additionally, all documents, such as but not limited to issued patents and patent applications, referred to herein are to be considered to be "incorporated by reference" in their entirety. Further, as used herein, the term "over", means formed, applied, deposited, or provided on but not necessarily in contact with the surface. For example, a coating layer formed or applied "over" a substrate surface does not preclude the presence of one or more other coating layers or films of the same or different composition located between the formed coating layer and the surface of the substrate. Still further the term "on" means formed, applied, deposited, or provided on and in contact with the surface.

In one non-limiting embodiment of the invention, the invention is practiced making soda-lime-silica glasses having a low iron content, e.g. but not limited to total iron $Fe_2O_3$ in the range of greater than 0.00-0.02 wt. % and a redox ratio in the range of 0.2-0.6, e.g. but not limited to a glass disclosed in U.S. Pat. No. 6,962,887.

In another non-limiting embodiment of the invention, the invention is practiced to make soda-lime-silica glasses having a high iron $Fe_2O_3$ content, e.g. but not limited to $Fe_2O$ in the range of equal to and greater than 0.1 wt. % and a redox ratio in the range of 0.2-0.6, e.g. but not limited to a glass disclosed in U.S. Pat. No. 6,313,053. In the practice of the invention, any known glass making process can be use to make the high iron, high redox ratio glass, and the low iron, high redox ratio glass, of the invention.

Any reference to composition amounts, unless otherwise specified, is "by weight percent" based on the total weight of the final glass composition. The "total iron" content of the glass compositions disclosed herein is expressed in terms of $Fe_2O_3$ in accordance with standard analytical practice, regardless of the form actually present. Likewise, the amount of iron in the ferrous state is reported as FeO, even though it may not actually be present in the glass as FeO. The terms "redox", "redox ratio" or "iron redox ratio" mean the amount of iron in the ferrous state (expressed as FeO) divided by the amount of total iron (expressed as $Fe_2O_3$). As used herein soda-lime-silica glasses having total iron (expressed as $Fe_2O_3$) in the range of greater than 0 to 0.02 wt. % is a low iron soda-lime-silica glass; glasses having total iron in the range of equal to and greater than 0.02 to 0.10 wt % is a medium iron soda-lime-silica glass, and soda-lime-silica glasses having total iron equal to and greater than 0.10 wt % is a high iron glass. Generally and not limiting to the invention, high iron soda-lime-silica glasses have total iron in the range of equal to and greater than 0.10 wt. % to 2.0 wt. %; equal to and greater than 0.10 wt. % to 1.5 wt. %; equal to and greater than 0.10 wt. % to 1.0 wt. %; and equal to and greater than 0.10 wt. % to 0.80 wt. %.

The high redox ratio is in the range of equal to 0.2 to 0.6, the invention, however, is not limited thereto and contemplates ranges of 0.3 to 0.6, 0.4 to 0.6 and 0.5 to 0.6. The glass disclosed in U.S. Pat. No. 6,962,887 has a redox ratio in the range of 0.2-0.6 and a total iron (expressed as $Fe_2O_3$) in the range of greater than 0 to equal to 0.02 wt. % and is a low iron soda-lime-silica glass. The glass disclosed in U.S. Pat.

No. 6,313,053 has a redox ratio in the range of 0.2-0.6 and a total iron (expressed as $Fe_2O_3$) in the range equal to 0.10 wt. % to 0.90 wt. % and is a high iron soda-lime-silica glass.

As can now be appreciated, the invention is directed to making high iron, high redox soda-lime-silica glasses and low iron, high redox soda-lime-silica glasses and is not limited to the optical properties, e.g. ultra violet, visible and IR transmission and absorption and the color of the glass and physical properties, e.g. glass thickness. In defining a non-limiting embodiment of a glass of the invention reference can be made to specific ranges or values of ultra violet, visible and IR transmission and absorption, and/or color of the glass and/or physical properties, e.g. glass thickness to identify a specific glass of the invention and/or a glass made by the practice of the invention. Presented below are common additives, e.g. color additives that are added to the glass batch materials, and/or molten glass to alter optical and physical properties of the glasses of the invention.

The "sulfur" content of the glass compositions disclosed herein is expressed in terms of $SO_3$ in accordance with standard analytical practice, regardless of the form actually present.

As used herein, "visible transmittance" and "dominant wavelength" values are those determined using the conventional CIE illuminant C and 2-degree observer angle. Those skilled in the art will understand that properties such as visible transmittance and dominant wavelength can be calculated at an equivalent standard thickness, e.g., 5.5 millimeters ("mm"), even though the actual thickness of a measured glass sample is different than the standard thickness.

A non-limiting embodiment of the present invention is practiced to make a low iron, high redox glass, e.g. but not limited to the type disclosed in U.S. Pat. No. 6,962,887, that provides an aesthetically desirable glass that is high in visible light transmittance in a normal (i.e. perpendicular) direction to a sheet of the glass but has an aesthetically pleasing blue or azure edge color when viewed on edge. By "high visible light transmittance" is meant visible light transmittance greater than or equal to 85%, such as greater than or equal to 87%, such as greater than or equal to 90%, such as greater than or equal to 91%, such as greater than or equal to 92%, at 5.5 mm equivalent thickness for glass from 2 mm to 25 mm sheet thickness. By "visible light" is meant electromagnetic radiation having a wavelength in the range of 380 nanometers (nm) to 770 nm. By "blue edge color" or "azure edge color" glass is meant having a dominant wavelength in the range of 480 nanometers ("nm") to 510 nm, such as in the range of 485 nm to 505 nm, such as in the range of 486 nm to 500 nm, such as in the range of 487 nm to 497 nm, when viewed on edge at an equivalent thickness of 5.5 mm.

In another non-limiting embodiment of the present invention, the present invention is practiced to make a high iron $Fe_2O_3$, high redox glass, e.g. but not limited to the type disclosed in U.S. Pat. No. 6,313,053 that provides a blue colored glass using a standard soda-lime-silica glass base composition and additionally iron and cobalt, and optionally chromium, as solar radiation absorbing materials and colorants. In particular, the blue colored glass includes about 0.40 to 1.0 wt. % total iron $Fe_2O_3$, preferably about 0.50 to 0.75 wt. %, about 4 to 40 PPM CoO, preferably about 4 to 20 PPM, and 0 to 100 PPM chromium oxide ("$Cr_2O_3$"). The redox ratio for the glass of the present invention is greater than 0.35 to 0.60, and preferably between 0.35 to 0.50. In one particular embodiment of the invention, the glass has a luminous transmittance of at least 55% and a color characterized by a dominant wavelength of 485 to 489 nanometers and an excitation purity of about 3 to 18 percent. In another embodiment of the invention, the glass has a luminous transmittance of at least 65% at a thickness of about 0.154 inches (3.9 mm) and a color characterized by a dominant wavelength of 485 to 492 nanometers and an excitation purity of about 3 to 18 percent.

As is appreciated, the invention is not limited to the color additives discussed above and any color additives to a soda-lime-silica glass known in the art can be used in the practice of the invention, for example, but not limited to the colorants selected from the group of CoO, Se, NiO, Cl, $V_2O_5$, $CeO_2$, $Cr_2O_3$, $TiO_2$, $Er_2O_3$, $Nd_2O_3$, $MnO_2$, $La_2O_3$ and combinations thereof.

As can now be appreciated, the invention is not limited to the process of, and/or equipment for, practicing the invention to make glasses of the invention, and any of the glass making processes and/or equipment known in the art can be used in the practice of the invention.

Figure 2:
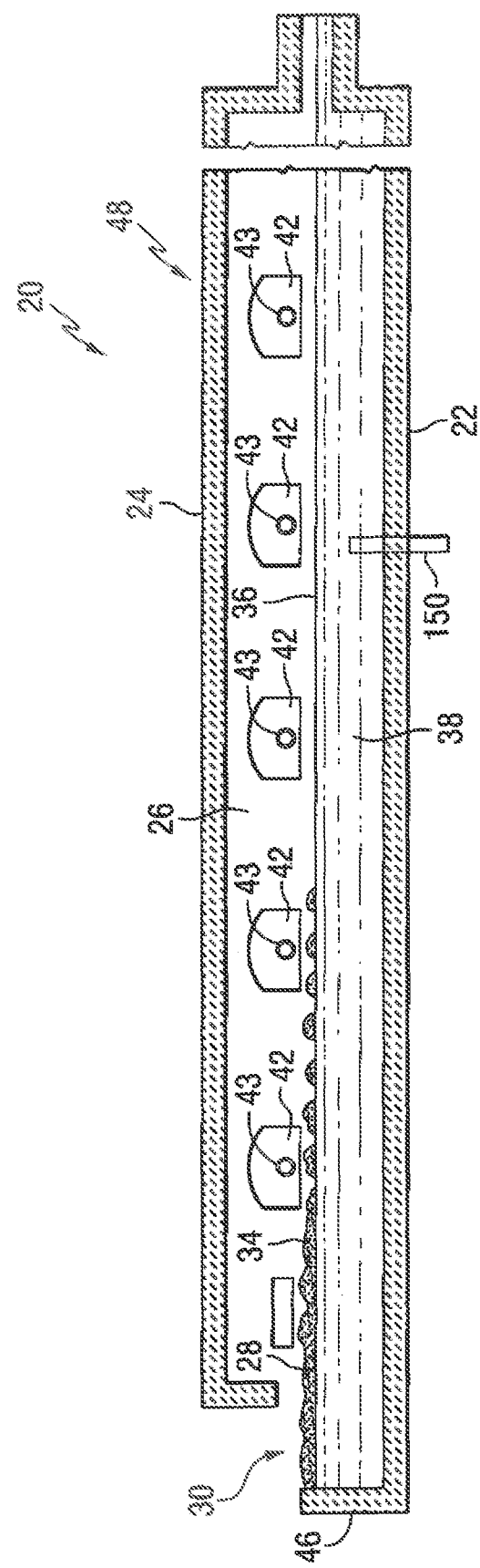
FIG. 2 is a vertical section of the melting section shown in FIG. 1A.

Referring to FIGS. 1 and 2 as needed, there is shown a conventional continuously fed, cross-tank fired, glass melting and non-vacuum refining furnace 20 having an enclosure formed by a bottom 22, roof 24, and sidewalls 26 made of refractory materials. The glass batch materials 28 are introduced through inlet opening 30 in an extension 32 of the furnace 20 known as the fill doghouse in any convenient or usual manner to form a blanket 34 floating on surface 36 of molten glass 38. Overall progression of the glass as shown in FIGS. 1A and 1B is from left to right in the figures, toward entrance end of a glass forming chamber 40 of the type used in the art to make float flat glass.

Flames (not shown) to melt the batch materials 28 and to heat the molten glass 38 issue from burner ports 42 spaced along the sidewalls 26 (see FIG. 2) and are directed onto and across the surface 36 of the molten glass 38. As is known by those skilled in the art, during the first half of a heating cycle, the flames issue from a nozzle 43 (see FIG. 2) in each of the ports on one side of the tank 20, as the exhaust of the furnace moves through the ports on the opposite side of the furnace. During the second half of the heating cycle, the function of the ports is reversed, and the exhaust ports are the firing ports, and the firing ports are the exhaust ports. The firing cycle for furnaces of the type shown in FIGS. 1 and 2 are well known in the art and no further discussion is deemed necessary. As can be appreciated by those skilled in the art, the invention contemplates using a mixture of air and fuel gas, or a mixture of oxygen and fuel gas, to generate the flames to heat the batch materials and the molten glass. For a discussion of using oxygen and fuel gas in the furnace of the type shown in FIG. 1, reference can be made to U.S. Pat. Nos. 4,604,123; 6,962,887; 7,891,763, and 8,420,928, which patents are hereby incorporated by reference.

The glass batch materials 28 as they move downstream from the batch feeding end or doghouse end wall 46 are melted in the melting section 48 of the furnace 20, and the molten glass 38 moves through waist 54 to refining section 56 of the furnace 20. In the refining section 56, bubbles in the molten glass 38 are removed, and the molten glass 38 is mixed or homogenized as the molten glass passes through the refining section 56. The molten glass 38 is delivered in any convenient or usual manner from the refining section 56 onto a pool of molten metal (not shown) contained in the glass-forming chamber 40. As the delivered molten glass 38 moves through the glass-forming chamber 40 on the pool of molten metal (not shown), the molten glass is sized and cooled. A dimensionally stable sized glass ribbon (not shown) moves out of the glass-forming chamber 40 into an annealing lehr (not shown). Glass making apparatus of the type shown in FIGS. 1 and 2, and of the type discussed above are well known in the art and no further discussion is deemed necessary.

Figure 3:
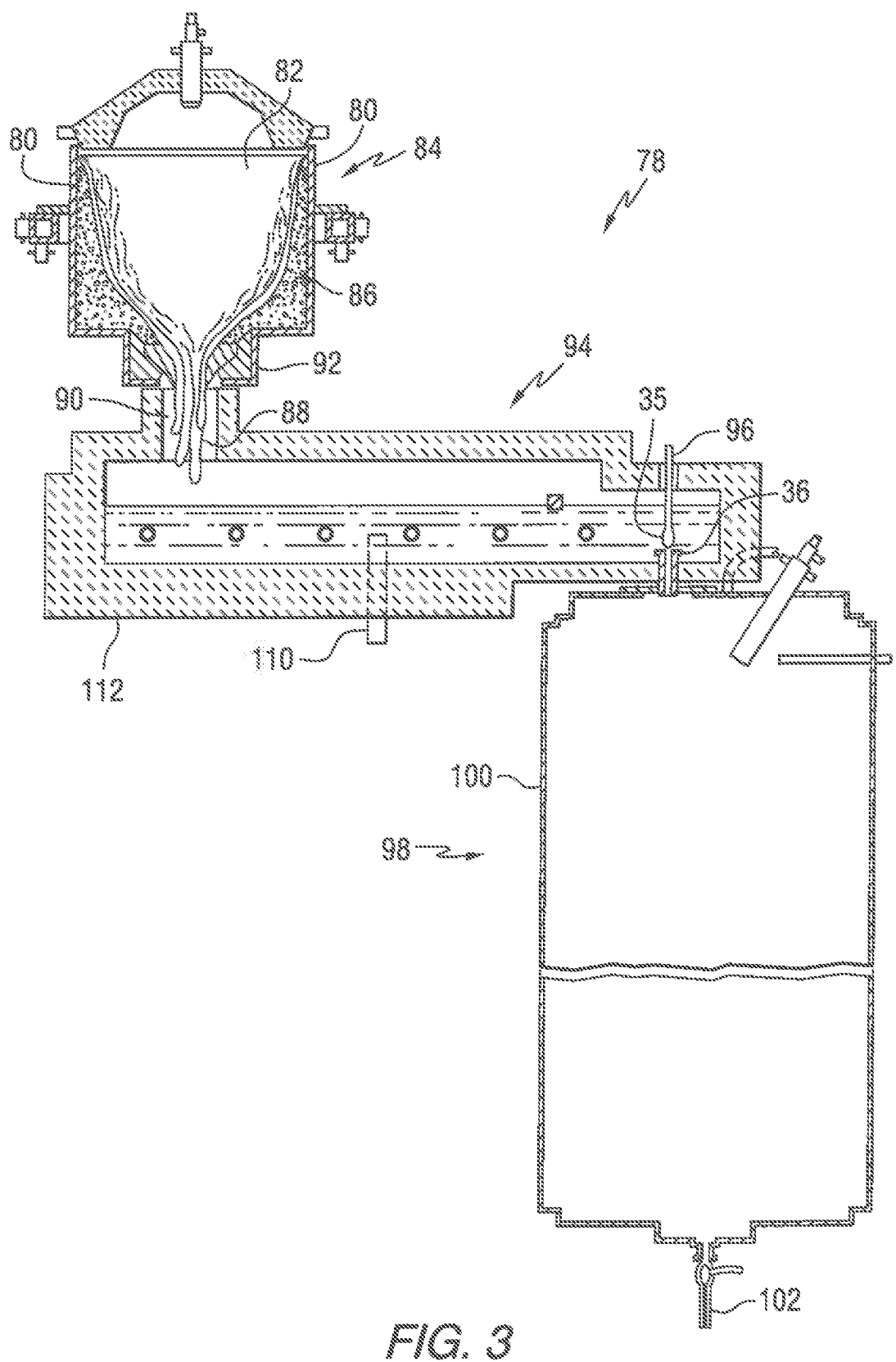
FIG. 3 is an elevated side view partially in cross section of a glass melting and refining apparatus that can be used in the practice of the invention.

Shown in FIG. 3 is continuously fed glass melting and vacuum refining equipment 78 for melting glass batch materials and refining the molten glass. Batch materials 80, preferably in a pulverulent state, are fed into cavity 82 of a liquefying vessel, e.g. a rotating drum 84. A layer 86 of the batch material 80 is retained on the interior walls of the vessel 84 aided by the rotation of the drum and serves as an insulating lining. As the batch material 80 on the surface of the lining 84 is exposed to the heat within the cavity 82, it forms a liquefied layer 88 that flows out of a central drain opening 90 at the bottom 92 of the vessel 84 to a dissolving vessel 94 to complete the dissolution of unmelted particles in the liquefied material coming from the vessel 84.

A valve 96 controls the flow of material from the dissolving vessel 94 into a generally cylindrical vertically upright vessel 98 having an interior ceramic refractory lining (not shown) shrouded in a gas-tight, water-cooled casing 100. A molten stream 102 of refined glass falls freely from the bottom of the refining vessel 98 and can be passed to a subsequent stage in the glass making process. For a detailed discussion on the operation of the equipment 78 shown in FIG. 3 reference can be made to U.S. Pat. No. 4,792,536.

The glasses of the invention can be made using any known glass making process. For example, but not limiting to the invention, the low iron, and high iron, high redox glasses of the invention can be made in the multi-stage melting and vacuum-assisted refining operation shown in FIG. 3. The refining stage of this known process is performed under a vacuum to reduce the concentration of dissolved gasses and volatile gaseous components, particularly sulfur-containing components. As will be appreciated by one skilled in the art, it can be advantageous to remove sulfur-containing components from certain float glass compositions since the combination of sulfur with iron in the glass can result in amber coloration of the glass at high redox ratios, for example, iron redox ratios above 0.4, especially above 0.5, due to the formation of ferric sulfide (also conventionally referred to as iron sulfide or iron polysulfide). Ferric sulfide can form throughout the bulk glass or in streaks or layers of a glass sheet. As used herein, the term "bulk glass" means the internal portion of a glass piece, such as a glass sheet, that is not chemically altered in the process of forming the glass. For a 2 millimeter ("mm") or thicker glass sheet made by a float glass process, the bulk glass does not include the outer region of the glass adjacent the glass surface, for example the outer 25 microns (as measured from the glass surface). The elimination of gaseous sulfur components in the vacuum refining stage of this known process helps prevent the formation of ferric sulfide in the glass and, thus, helps prevent amber coloration.

In the preferred practice of the invention, the glass of the invention is made using a conventional non-vacuum float glass system. By "conventional" or "non-vacuum" float glass system is meant that the molten glass is not subjected to a vacuum stage such as that in U.S. Pat. Nos. 4,792,536 and 5,030,594 during the glass melting or refining operations. In one embodiment of the invention, the glass can be essentially free of sulfur. By "essentially free of sulfur" is meant that no intentional addition of sulfur-containing compounds is made to the glass composition. However, trace amounts of sulfur can be present in the glass due to impurities in the batch materials or other sources, including cullet. By "trace amounts of sulfur" is meant sulfur in the range of greater than 0 wt. % to 0.03 wt. %. In another embodiment, sulfur-containing materials, such as sulfur-containing refining aids, can be intentionally added to the glass composition, e.g., to improve the melting characteristics of the glass batch materials. However, in this embodiment, if such sulfur-containing materials are intentionally added, they can be added such that the retained sulfur content (e.g., the average amount of $SO_3$ left in the resultant bulk glass) is less than or equal to 0.2 wt. %, such as less than or equal to 0.15 wt. %, such as less than 0.11 wt. %, such as less than or equal to 0.1 wt. %, such as less than or equal to 0.08 wt. %, such as less than or equal to 0.05 wt. %. In one embodiment, the residual sulfur can be in the range of 0.005 wt. % to 0.2 wt. %.

As mentioned above and as shown in FIGS. 1 and 2 conventional float glass systems typically include a furnace or melter into which the glass batch materials are placed for melting. In one practice of the invention, the melter can be an oxygen fuel furnace in which the fuel is mixed with oxygen to supply heat to melt the batch materials. In another practice of the invention, the melter can be a conventional air-fuel melter in which air is mixed with the combustion fuel to provide heat to melt the batch materials. In a still further practice of the invention, the melter can be a hybrid-type melter in which a conventional air-type melter is augmented with oxygen lances to supplement the heated air with oxygen before combustion.

One difference between glasses made from batch materials melted in an oxygen fuel furnace and a conventional air-fuel melter is that the glass made from batch materials melted in an oxygen fuel furnace typically has a water content in the range of 425-600 parts per million, whereas the glass made from batch materials melted in a conventional air-fuel melter typically has a water content in the range of 200-400 parts per million, and glass made from 100% cullet melted in an oxygen fuel furnace typically has a water content of about 700 parts per million. In the preferred practice of the invention, the glass batch materials are melted in an oxygen fuel furnace or a conventional air-fuel melter. In the following discussion of the invention, the invention is practiced using an oxygen fuel furnace, however, the invention is not limited thereto, and the invention can be practiced using any type of glass melting system.

In one non-limited embodiment of the invention, the redox ratio is within the range of 0.2 to 0.6, and the total iron ($Fe_2O_3$) is within the range of greater than 0 to 0.02 wt. %, and in another non-limited embodiment of the invention, the redox ratio is within the range of 0.2 to 0.6, and the total iron ($Fe_2O_3$) is within the range of 0.10 to 2.0 wt. %. In the practice of the invention typical batch materials for making soda-lime-silica glass are introduced into the melter, the furnace 20 shown in FIG. 1 and furnace 84 shown in FIG. 3. Typical batch materials for a soda-lime-silica glass composition include sand, soda ash, limestone, alumina and dolomite. As will be appreciated by one skilled in the art, conventional soda-lime-silica batch materials also include melting and refining aids, such as salt cake (sodium sulfate). Salt cake can also be an oxidizer when incorporated into the glass batch. As discussed above, the presence of sulfur with iron can lead to amber or yellowish coloration on the bottom surface of the float glass ribbon due to the local formation of iron polysulfides at or near the bottom surface of the glass. Therefore, in one aspect of the invention, to reduce retained sulfate and subsequent coloration from iron polysulfide, no sulfur-containing melting and refining aid materials, e.g., salt cake, are intentionally added to the glass batch materials. Due to the absence of the salt cake, melting the batch materials can be more difficult than would be with the salt cake. Therefore, to offset the absence of salt cake, the temperature in the melter can be increased and/or the throughput of the melter can be decreased to provide sufficient melting of the batch materials. Typical batch materials to make a soda-lime-silicate glass can be selected to provide a final glass product having a high iron, high redox ratio glass, or a low iron, high redox ratio glass having the ingredients in the weight percent ranges shown in following Table 1:

TABLE 1

| Ingredient | Range of Ingredient in Weight Percent |
|---|---|
| $SiO_2$ | 65-75 |
| $Na_2O$ | 10-20 |
| CaO | 5-15 |
| MgO | 0-5 |
| $Al_2O_3$ | 0-5 |
| $K_2O$ | 0-5 |
| $SnO_2$ | greater than 0 to 5 |

In the preferred non-limiting embodiment of the invention, the redox ratio is increased by the addition of tin alone, and/or in combination with other additives, to the glass batch materials and/or molten glass, and/or temperature increases to melt the glass batch materials and/or heat the molten glass, to reduce the ferric iron (Fe+++) to the ferrous iron (Fe++). As is appreciated the invention contemplates changing glass campaigns from making soda-lime-silica glasses having low iron redox ratio to soda-lime-silica glasses having high iron redox ratio, and changing glass campaigns from making soda-lime-silica glasses having high iron redox ratio to soda-lime-silica glasses having low iron redox ratio.

The following discussion is directed to additives to reduce the ferric iron (Fe+++) to the ferrous iron (Fe++) to increase the redox ratio and/or to maintain the redox ratio in the range of 0.2 to 0.6. The glass in this non-limiting embodiment of the invention is a low iron, high redox glass of the type disclosed in, but not limited to U.S. Pat. No. 6,962,887. To provide the azure edge color, a colorant portion can be added to the batch materials. In one embodiment, the colorant portion can include one or more iron-containing compounds with the total iron ($Fe_2O_3$) being less than 0.02 wt. %, such as in the range of 0.007 to 0.02 wt. %. Additional or alternative colorants can include one or more of cobalt oxide (CoO) such as in the range of 0 ppm to 5 ppm, neodymium oxide ($Nd_2O_3$) in the range of 0 wt. % to 0.1 wt. %, and/or copper oxide (CuO) in the range of 0 wt. % to 0.03 wt. %. The redox ratio of the glass can be controlled in accordance to the invention to be within the range of 0.2 to 0.6, such as 0.3-0.5, such as 0.4 to 0.6, such as 0.4-0.5, such as 0.6.

In one embodiment of the invention, the glass batch materials can be essentially free of sulfur, i.e., no intentional addition of sulfur-containing materials is made to the batch materials. However, as will be appreciated by one skilled in the art, sulfur could be present from other sources, such as impurities in the batch materials and/or cullet.

If salt cake is totally eliminated from the batch materials, in addition to increased melting difficulties, the redox ratio of the glass can increase to the point where polysulfides can be formed in the bulk glass, thus providing the bulk glass with an amber tint. In order to control the redox ratio of the glass, non-sulfur containing oxidizers can be added to the batch materials in place of salt cake to oxidize the Fe++ to Fe+++ to decrease the redox ratio. One non-limiting example of such a material is sodium nitrate ($NaNO_3$).

While sodium nitrate can prevent the redox ratio of the glass from increasing to the point where bulk polysulfide formation results in an undesirable amber tint in the bulk glass, sodium nitrate can lead to the production of $NO_x$ emissions during the glass production process. These $NO_x$ emissions can be treated in conventional manner before release of the melter gasses to the atmosphere to meet governmental restrictions on $NO_x$ emissions.

In a further embodiment, manganese oxide ($MnO_2$) and cerium oxide ($CeO_2$) can be added to the batch materials to control the redox. Manganese oxide is used in concentration of 0-1.0 wt. % and preferably greater than 0 to 1.0 wt. %. Cerium oxide can be very effective even at concentrations in the range of greater than 0 wt. % to 0.2 wt. %, such as less than or equal to 0.1 wt. %. One result of the use of cerium oxide is that it can cause surface fluorescence when the glass is exposed to ultraviolet light, such as that present in normal sunlight.

In a still further embodiment of the invention, rather than completely eliminating salt cake from the batch materials, a mixture of salt cake and one or more non-sulfur containing oxidizing materials, such as but not limited to sodium nitrate, manganese dioxide, and/or cerium oxide, can be added to the batch materials to aid in melting and refining the batch materials. If salt cake is present, the initial introduction of non-sulfur-containing oxidizing materials can result in increased retention of sulfate but ultimately the amount of salt cake added to the batch materials can be controlled to provide a final glass product that is substantially free of sulfur. By "substantially free of sulfur" is meant that residual sulfur (i.e., $SO_3$) in the bulk glass is less than or equal to 0.2 wt. %, such as less than or equal to 0.15 wt. %, such as less than or equal to 0.11 wt. %, such as less than or equal to 0.1 wt. %, such as less than or equal to 0.08 wt. %, such as less than or equal to 0.05 wt. %. The utilization of both salt cake and non-sulfur containing oxidizing agents can maintain the melting and refining conditions of the glass batch materials and redox ratio of the glass without leading to or promoting the undesirable formation of polysulfides at the region adjacent the bottom of the glass.

In a still further embodiment of the invention, the melter can be an oxygen fuel furnace. It has been observed that for batch materials having a given level of salt cake, the retained sulfate in the resultant glass when the batch materials are melted using an oxygen fuel furnace is less than that retained for the same glass batch composition using a conventional air furnace. Thus, salt cake or another sulfur-containing oxidizer can be added to the batch materials and melted in an oxygen fuel furnace to provide lower retained sulfate than would be present if the same batch composition were melted in a conventional air-fuel furnace. In this embodiment, the sulfur-containing batch material should be added at a level to provide a glass product that is substantially free of sulfur.

Thus, as discussed above, the formation of undesirable amber coloration in the glass can be reduced or eliminated by adjusting and/or selecting the components of the glass composition. However, in another aspect of the invention, this undesirable amber coloration can be affected by additionally or alternatively controlling the amount of dissolved iron in the molten metal of the molten metal bath.

In a float glass process, molten glass flows from a furnace onto a pool of molten tin in a float bath to form a float glass ribbon. During the float process, oxygen from the bottom surface of the float glass ribbon, i.e., the surface of the ribbon in contact with the molten tin, can diffuse into the molten tin. Consequently, multivalent ions at the bottom surface of the glass can become chemically reduced. For example, sulfur in or near the bottom surface of the glass can be reduced from $S^{+6}$ (hexavalent sulfur) to $S^{-2}$ (sulfide). These sulfides can react with iron, particularly ferric iron ($Fe^{+3}$), to form iron polysulfides at the bottom surface of the glass ribbon. The iron can already be present in the glass or, in some instances, iron present in the molten tin can diffuse into the bottom surface of the glass to react with the sulfides. Iron polysulfide is a powerful colorant and can produce a region or layer of amber color several microns thick in the bottom of the glass ribbon. Thus, if one were to look through the edge of the resultant glass sheet at an oblique angle, the region of amber coloration on the bottom of the glass can make blue glass appear green or yellowish-green. This perceived color shift of the glass edge at oblique viewing angles is not aesthetically desirable for most applications. The undesirable effect of amber coloration on the bottom surface of the glass can also be present in other tinted glass, such as those having a bulk glass color of green or bluish green.

As will be appreciated by one of ordinary skill in the glass making art, medium iron float glass and low iron float glass is particularly susceptible to an iridescent bloom formation on the bottom surface. During the float glass forming process, tin oxide (SnO) from the tin bath can diffuse into the bottom surface of the float glass ribbon. When the resultant glass is reheated in the presence of oxygen, e.g., air, such as during bending, tempering, or sagging operations, highly concentrated tin oxide (SnO) on the bottom surface of the glass can oxidize to form tin dioxide ($SnO_2$). The subsequent microscopic volume expansion can cause the appearance of an iridescent haze on the glass. U.S. Pat. No. 3,305,337 teaches adding certain reactive elements, including iron, to the tin bath can capture oxygen, thus reducing the migration of tin oxide into the bottom of the glass and, therefore, the potential for bloom formation. Under equilibrium conditions, a given concentration of iron in the molten tin will be reached as a function of the concentration of iron in the glass. For example, while producing a medium iron float glass with a concentration of 0.1 wt. % iron oxide, the equilibrium concentration of iron in the molten tin bath can be about 0.01 wt. % Fe. If the concentration of iron in the tin is increased to 0.04 wt. % by a deliberate addition of iron to reduce the potential for bloom formation, increased diffusion of iron from the tin bath into the bottom surface of the glass can raise the average concentration of iron in the bottom surface of the glass to about 0.2 wt. % iron oxide. This additional iron in the bottom surface of the glass can react with sulfur (particularly sulfides $S^{-2}$) to form iron polysulfides to produce an amber color center. Therefore, in order to decrease the formation of the iron polysulfide color centers at the bottom surface of the glass, the molten tin is substantially free of iron. By "substantially free of iron" is meant that no or substantially no iron is intentionally added to the molten tin. In one embodiment, the concentration of iron (Fe) in the molten tin is less than or equal to 0.05 wt. %, such as less than or equal to 0.04 wt. %, such as less than or equal to 0.03 wt. %, such as less than or equal to 0.02 wt. %, such as less than or equal to 0.01 wt. % based on the total weight of the molten metal. Therefore, in one aspect of the invention, no iron is intentionally added to the molten tin, e.g., for two or more months prior to or during production of the low iron glass of the invention.

As will be appreciated by one skilled in the art, even though no iron may be intentionally added to the molten tin, iron concentrations greater than those desired above could still be present in the molten tin as a consequence of the previous production of glass having a higher iron content than the desired ranges disclosed above. Therefore, the molten tin can be treated, e.g., cleaned, to remove dissolved iron as disclosed in U.S. Pat. No. 6,962,887.

The discussion is now directed to non-limiting embodiments of the invention to increase the redox ratio by the addition of tin and tin containing compounds to the glass batch materials and/or to the molten glass to reduce the ferric iron (Fe+++) to the ferrous iron (Fe++). In the preferred practice of the invention, tin and/or tin containing compounds are added to the glass batch materials and/or molten glass in any convenient manner, e.g. but not limited to (1) adding $SnO_2$ and/or tin sulfate ("SnS") to the glass batch materials as a dry powder; (2) adding pellets of $SnO_2$ to the glass batch materials; (3) adding glass cullet to the batch material, the cullet having a coating of $SnO_2$ over and/or on a glass surface and/or glass cullet having tin and/or tin containing compounds within the body of the glass; (4) adding ground particles of tin and/or tin containing compounds, e.g. but not limited to Sn, $SnO_2$, and SnS to the glass batch materials; (6) mixing dry $SnO_2$ with a liquid to make a slurry and adding the slurry to the batch materials; (7) bubble tin containing gas, e.g. but not limited thereto tin halogens, e.g. but not limited to tin chloride ("$SnCl_4$") into the molten glass in the furnace or melter using the bubblers 150 shown in FIGS. 1A and 2, (8) adding organo-tin compounds and organo-tin compounds containing halogens, e.g. but not limited to $Sn(C_4H_9)_3H$.

In the preferred practice of the invention, tin and/or tin dioxide is added to the glass batch and molten glass in the furnace 20 (FIG. 1A) or melter 84 (FIG. 3); the invention, however, is not limited thereto and tin oxides, tin oxynitrides, tin nitrides, tin halogens, to name a few and combinations thereof can be added to provide tin ions to increase the redox ratio.

It is believed that the reaction to reduce the ferric iron (Fe+++) to the ferrous iron (Fe++) in the resultant glass is better appreciated by the following discussion:

$$Sn^{4+} = Sn^{2+} + 2e^- \qquad \text{Equation 1}$$

$$Sn^{2+} + 2Fe^{3+} + 2e^- = Sn^{4+} + 2Fe^{2+} \qquad \text{Equation 2}$$

Equations Discussion:

Equation 1 shows reactions believed to occur where the $Sn^{4+}$ ions ($SnO_2$) that are added at room temperature become reduced to $Sn^{2+}$ ions (SnO) plus two electrons when the material is heated and incorporated into the glass structure. Those 2 electrons from the single $Sn^{4+}$ ion can facilitate reduction of two ferric iron (Fe+++) ions to two ferrous iron (Fe++) ions while the glass is cooling as shown in Equation 2. Essentially the $Sn^{2+}$ ions prefer the $Sn^{4+}$ state at some temperature lower than melting temperatures and thus reduction of the iron ions occurs while the ions can still transfer charge.

Laboratory melts were made to determine the effect of tin alone or in combination with temperature changes and/or graphite. The batch for the soda-lime-silica glass included the material listed in TABLE 2 below:

TABLE 2

| Material | Amount |
| --- | --- |
| Low iron sand | 369.44 grams |
| Soda Ash | 119.96 grams |
| Low iron Limestone | 38.83 grams |
| Low iron dolomite | 73.36 grams |
| Graphite (when added) | 0.303 grams |
| Iron oxide from sand | 70 parts per million |

The batch materials were heated in 50° F. steps within a temperature range 2450° F. to 2600° F. in a platinum crucible. The batch was heated for a period of ½ hour at each step and for 1 hour at 2600° F. The melted batch was fritted (placed in water) and placed in a platinum crucible and heated to a temperature of 2650° F. or 2800° F. (as noted below), and held at that temperature for 2 hours. The melt was poured on a metal sheet and annealed at a temperature near 1130° F. Specimens were cut from the annealed glass and the redox ratio of the specimens determined. Preparing laboratory glass samples and determining the redox ratio of soda-lime-glass are well known in the art and no further discussion is deemed necessary.

Figure 4:
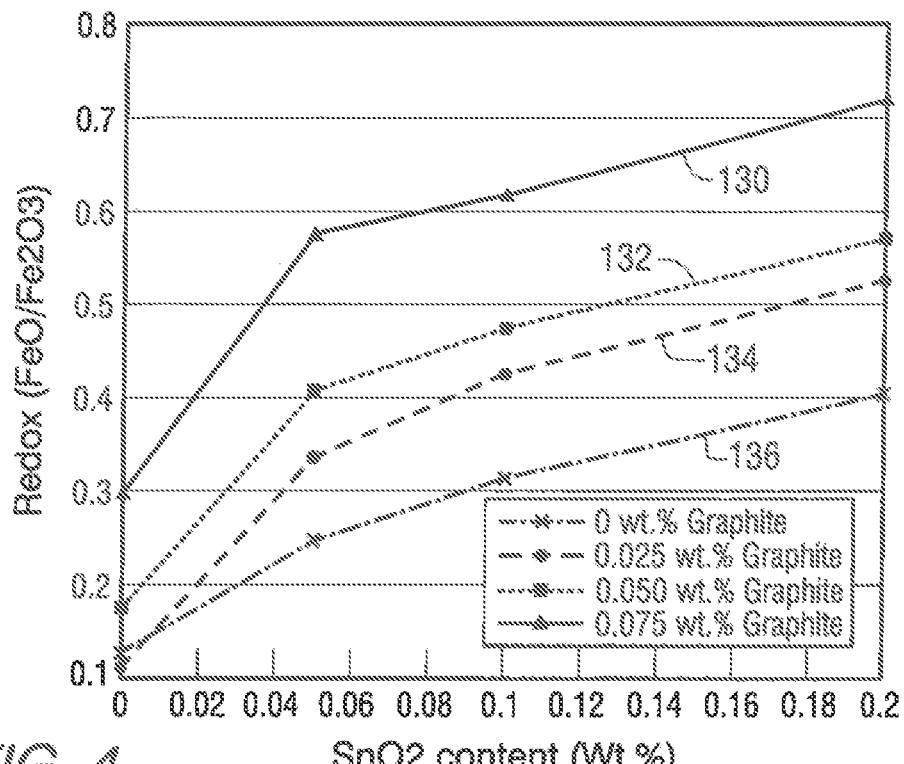
FIG. 4 shows a set of measurements of low iron, soda-lime-silica glass laboratory samples to show the effect of graphite and tin dioxide on the redox ratio. A straight line connects the measurements for each sample having similar amounts of graphite. The batch for each sample was melted at a temperature of 2650° F.

It has been concluded from the results of the laboratory melts that temperature and/or carbon based reducing agents, e.g. but not limited to graphite, in combination with tin dioxide ($SnO_2$) have an effect on reducing the ferric iron (Fe+++) to the ferrous iron (Fe++) to increase the redox ratio. More particularly and with reference to FIGS. 4-7 as needed there is shown connected data points providing graph curves for soda-lime-silica low iron containing glass. The graph curves 130, 132, 134, and 136 of FIG. 4 show connected data points for samples having varying amounts of tin dioxide in the range of 0 to 0.2 wt. %, and graphite in the amounts of 0 wt. % (curve 136), 0.025 wt. % (curve 134), 0.050 wt. % (curve 132) and 0.075 wt. % (curve 130). The glass samples were heated to a temperature of 2650° F. Graph curve 136 shows the increase of the redox ratio by increasing the tin dioxide and having 0 wt. % graphite. The data points for the graph curves 130, 132, 134, and 136 at 0 wt. % tin dioxide show an increase in the redox ratio for increases of graphite. The graph curves 130, 132, 134, and 136 show an increase in the redox ratio for increases in graphite and tin dioxide that out perform increases of graphite and tin dioxide alone.

Figure 5:
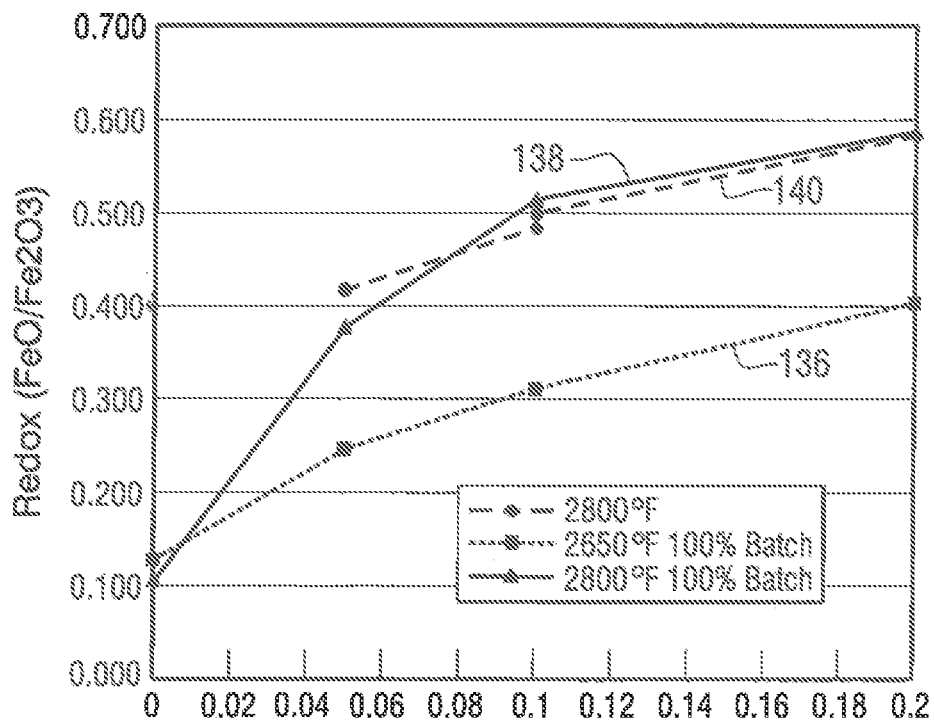
FIG. 5 shows a set of measurements of low iron, soda-lime-silica glass laboratory samples (1) to show the effect of temperature, (2) to show the effect of tin dioxide added to the batch, and (3) to compare tin dioxide added to the batch to glass with tin dioxide already in the glass as 100% cullet. The samples were free of graphite and a straight line connects samples from batches heated at the respective melt temperature.

FIG. 5 shows three graph curves 136, 138 and 140 for samples that did not contain graphite additions to highlight the effects of temperature. The graph curve 136 is also shown in FIG. 4 and shows an increase in the redox ratio by increasing the tin dioxide. In FIG. 5 the graph curve 136 shows an increase in the redox ratio as the tin dioxide is increased and the redox ratio for glass melted at 2650° F. Graph curve 138 shows an increase in the redox ratio as the tin dioxide increases with a melting temperature of 2800° F. The graph curves 136 and 138 show an increase in the redox ratio for a higher melting temperature, and tin dioxide that out perform the lower melting temperature and tin dioxide. The graph curve 140 shows data points for melted glass cullet having tin dioxide alone. Graph curve 140 shows that tin dioxide can be added to the glass batch by additions of glass containing tin oxide, e.g. glass having a coating of tin oxide and/or tin dioxide within the body of the glass.

Figure 6:
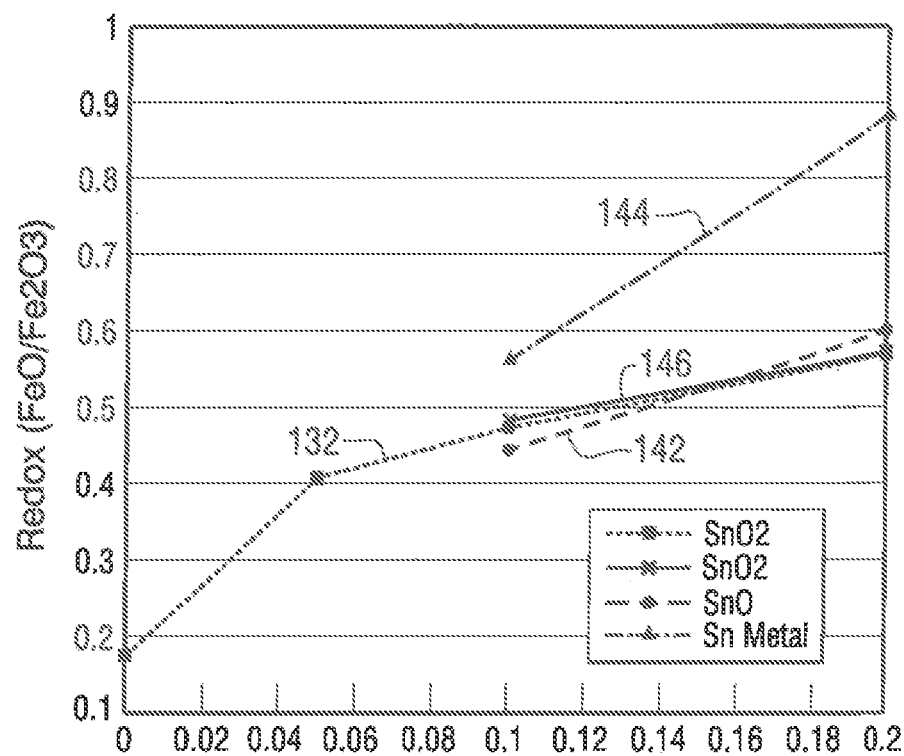
FIG. 6 shows a set of measurements of low iron, soda-lime-silica glass laboratory samples showing the effect tin compounds on the redox ratio. The batch was melted at 2650° F. and a straight line connects common measurements.

The graph curves of FIG. 6 include the graph curves 132, 142, 144 and 146 to show the performance of tin dioxide (curve 146), tin oxide (curve 142) and tin metal (curve 144) compared to graph curve 132 discussed above. From the data points shown in FIG. 6 the tin metal provides the highest redox ratio. In one non-limiting embodiment of the invention $SnO_2$ in the glass composition is in the range of greater than 0 to 0.70 wt. %, and preferably greater than zero to 0.60 wt. % or greater than 0.015 to 0.58 wt. %. The $SnO_2$ in addition to increasing the redox ratio is expected to act as a fining agent and reduce the seeds in the glass.

Figure 7:
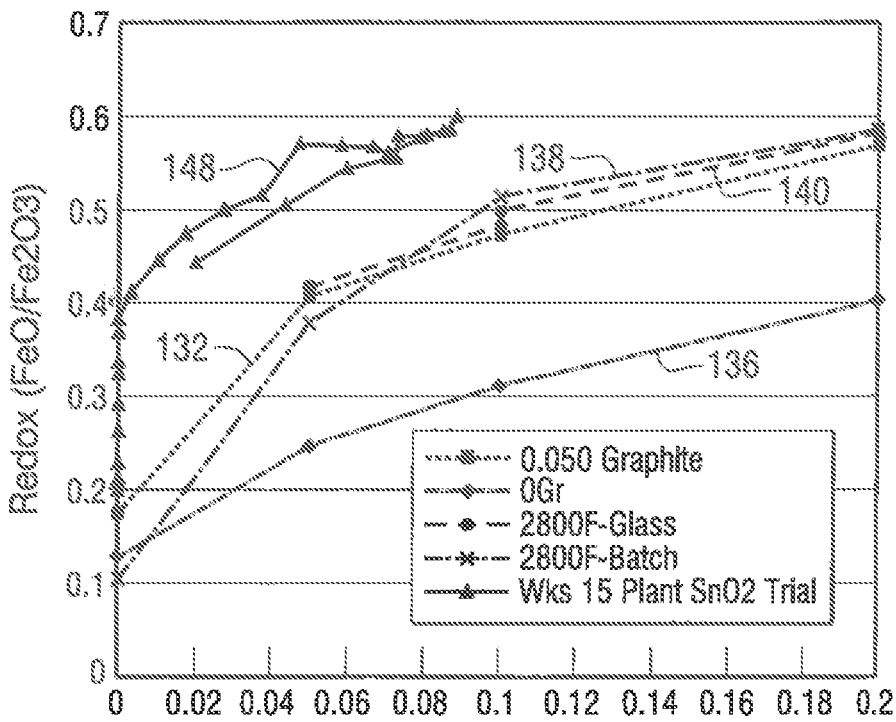
FIG. 7 shows a comparative set of measurements between low iron glasses produced during a plant trial in a real furnace under real operating conditions to low iron glasses from laboratory melts.

FIG. 7 shows a comparative set of measurements between low iron glasses (graph curve 148) produced during a plant trial in a real furnace under real operating conditions to low iron glasses from laboratory melts (graph curves 132, 136-138 and 140). The results from the plant trial indicate the laboratory samples can be used to describe the effects of $SnO_2$ concentration on iron redox under real processing conditions. The redox is higher for the plant trial due to higher furnace temperatures near 2950° F. vs. the highest temperature of 2800° F. in the laboratory. The plant trial samples were made under the following operating conditions: 490 tons of glass per day, $SnO_2$ was added as dry powder to a slurry and mixed into the batch materials, ~15% cullet that did not have $SnO_2$, melting temperature near 2950° F., water content in the glass near 500 ppm, floated and formed on a tin bath, glass was annealed.

Figure 8:
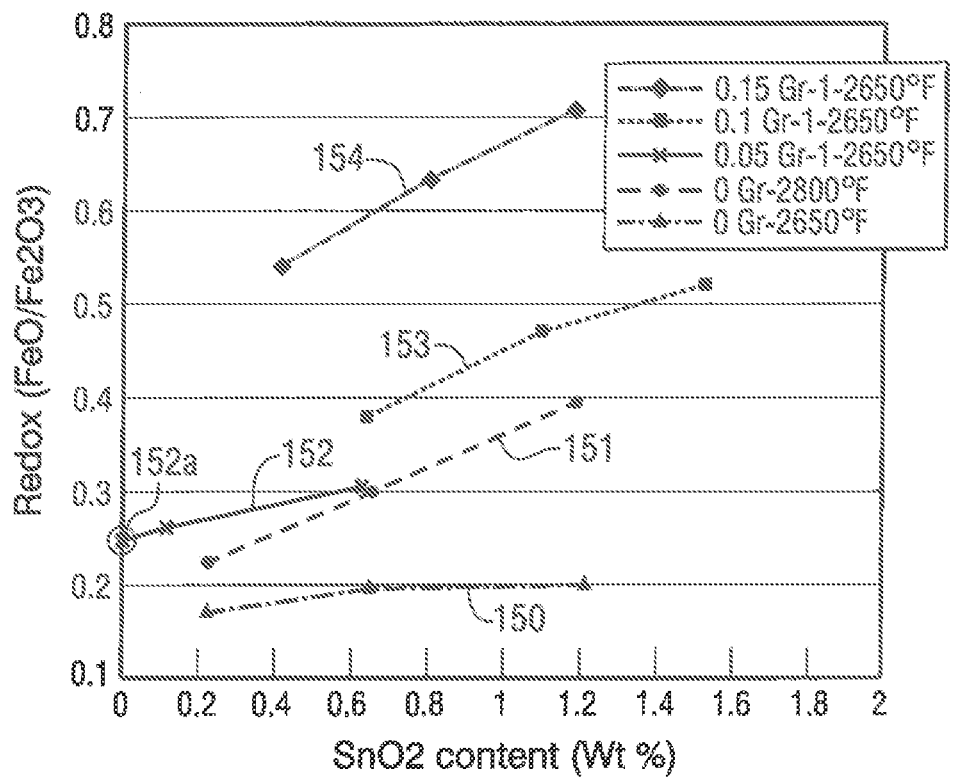
FIG. 8 shows a set of measurements of high iron soda-lime-silicate glass samples showing the effect of graphite, temperature, tin dioxide and tin on the redox ratio. A straight line connects common measurements.

With reference to FIG. 8 there is shown a set of graph curves 150-154 showing changes in the redox ratio for changes in tin dioxide for high iron glasses with $Fe_2O_3$ content near 0.52 wt. %. The graph curves 150-154 provide data on redox effects from tin dioxide content, temperature changes and changes in wt. % of graphite. More particular, the graph curve 150 shows redox changes with tin additions, the glass melted at 2650° F. and no graphite; the graph curve 151 shows redox changes with tin additions, the glass melted at 2800° F. and has no graphite; the graph curve 152 shows redox changes with tin additions, the glass melted at 2650° F. and 0.05 wt. % graphite; the graph curve 153 shows redox changes with tin additions, the glass melted at 2650° F. and 0.10 wt. % graphite, and the graph curve 154 shows redox changes with tin additions, the glass melted at 2650° F. and 0.15 wt % graphite. The data point 152A provides a base line for 0 wt. % tin dioxide.

From the information provided by FIGS. 4-8, it can now be appreciated that the invention is not limited by the amount of tin and/or tin containing compound added to oxidize the ferrous iron (Fe++) to ferric iron (Fe+++) to reduce the redox ratio of the glass being made. More particularly Sn and tin containing compounds can be used alone, in combination with carbon, e.g. but not limited graphite, coal and/or oil, altering the glass batch melting temperature and combinations thereof. In the practice of non-limiting embodiments of the invention, the tin and tin containing compounds provide tin in the range of greater than zero to 5 wt. %; 0.10 to 4 wt. %, 0.4 to 3 wt. % and any wt. % within the rages recited.

Shown in Tables 3-7 is a range of glass compositions and approximate batch component ranges with $SnO_2$ and/or graphite to make the low iron, high redox ratio glass of the invention.

Table 3 is a range of glass compositions including $SnO_2$ and graphite, and corresponding batch ingredients to make the glass.

TABLE 3

| Ingredient | Min (lbs) | Max (lbs) | Ingredient | Minimum Wt. % | Maximum Wt. % |
|---|---|---|---|---|---|
| sand | 1000 | 1000 | $SiO_2$ | 65.00 | 80.00 |
| soda ash | 200 | 400 | $Na_2O$ | 10.00 | 20.00 |
| limestone | 40 | 100 | CaO | 5.00 | 15.00 |
| dolomite | 100 | 400 | MgO | 0.00 | 8.00 |
| salt cake | 0 | 20 | $SO_3$ | 0.00 | 1.000 |
| $SnO_2$ | 0.07 | 40 | $Fe_2O_3$ | 0.00 | 0.0200 |
| graphite | 0 | 8 | $Al_2O_3$ | 0.00 | 5.00 |
| | | | $K_2O$ | 0.00 | 5.00 |
| | | | $SnO_2$ | 0.0050 | 2.00 |

Table 4 is a glass composition and approximate batch ingredient weights without $SnO_2$ and with graphite.

TABLE 4

| Ingredients | lbs. | Ingredient | Wt. | Wt. % |
|---|---|---|---|---|
| sand | 1000.00 | $SiO_2$ | 997.50 | 73.30 |
| soda ash | 316.00 | $Na_2O$ | 188.06 | 13.82 |
| limestone | 88.00 | CaO | 120.42 | 8.85 |
| dolomite | 234.00 | MgO | 51.45 | 3.78 |
| salt cake | 9.50 | $SO_3$ | 2.67 | 0.197 |
| graphite | 1.00 | $Fe_2O_3$ | 0.10 | 0.0077 |
|  |  | $Al_2O_3$ | 0.50 | 0.04 |

Table 5 is a preferred glass composition and approximate batch ingredient weights with $SnO_2$ and graphite.

TABLE 5

| Ingredients | lbs. | Ingredient | Wt. | Wt. % |
|---|---|---|---|---|
| sand | 1000.00 | $SiO_2$ | 997.50 | 73.18 |
| soda ash | 320.00 | $Na_2O$ | 190.39 | 13.97 |
| limestone | 80.00 | CaO | 117.76 | 8.64 |
| dolomite | 240.00 | MgO | 52.72 | 3.87 |
| salt cake | 9.50 | $SO_3$ | 2.67 | 0.196 |
| $SnO_2$ | 0.70 | $Fe_2O_3$ | 0.31 | 0.0230 |
| Graphite | 0.70 | $Al_2O_3$ | 0.50 | 0.04 |
|  |  | $SnO_2$ | 0.6913 | 0.0507 |

Table 6 shows a preferred range of colorants and/or redox controlling agents:

TABLE 6

| Ingredients | Amount |
|---|---|
| $Nd_2O_3$ | 0-0.1 wt. % |
| CoO | 0-40 ppm |
| $Fe_2O_3$ | 0-0.02 wt. % |
| $Cr_2O_3$ | 0-0.05 wt. % |
| $TiO_2$ | 0-0.05 wt. % |
| $CeO_2$ | 0-1 wt. % |
| $MnO_2$ | 0-1 wt. % |

The invention contemplates the lower range of all or selected ones of the ingredients of Table 6 to have a lower range of greater than 0.

Shown in Table 7 is an example of a glass composition of the invention with 0.075 wt. % graphite in the batch and 0.1 wt. % tin dioxide added to the batch with a melting temperature of 2650° F. and the performance:

TABLE 7

| Ingredient | Ingredient in wt. % |
|---|---|
| $SiO_2$ | 73.11 |
| $Na_2O$ | 13.65 |
| $K_2O$ | 0.01 |
| CaO | 8.68 |
| MgO | 3.16 |
| $Al_2O_3$ | 0.03 |
| $Fe_2O_3$ | 0.0097 |
| SrO | 0.02 |
| $SO_3$ | 0.2 |
| $ZrO_2$ | 0.001 |
| $FeO/Fe_2O_3$ | 0.505 |
| $SnO_2$ | 0.111 |

The glass sample in Table 7 had an LTA of at least 91.23%; a dominant wavelength in the range of 490-500, e.g. 496.68 nanometers; an excitation purity in the range of 0.10 to 0.15, e.g. 0.14%; a TSUV in the range of 85-93%, e.g. 89.07%; a TSIR in the range of 85-90%, e.g. 87.82% and a TSET in the range of 87-91%, e.g. 89.43% at a thickness of 5.6 mm. Similar compositions would be expected to exhibit LTA greater than or equal to 85%, DW in the range of 480 nm to 510 nm at 5.5 mm equivalent thickness for glass from 2 mm to 25 mm sheet thickness. The radiation transmittance data would be based on TSUV 300-390 nanometers; LTc 400-770 nanometers and TSIR 800-2100 nanometers.

In another non-limiting embodiment of the present invention, the present invention is practiced to make a high iron $Fe_2O_3$, high redox glass, e.g. but not limited to the type disclosed in U.S. Pat. No. 6,313,053 that provides a blue colored glass using a standard soda-lime-silica glass base composition and additionally iron and cobalt, and optionally chromium, as solar radiation absorbing materials and colorants. In particular, the blue colored glass includes about 0.40 to 1.0 wt. % total iron as $Fe_2O_3$, preferably about 0.50 to 0.75 wt. %, about 4 to 40 PPM CoO, preferably about 4 to 20 PPM, and 0 to 100 PPM chromium oxide ("$Cr_2O_3$"). The redox ratio for the glass of the present invention is greater than 0.2 to 0.60, and preferably between 0.35 to 0.50. In one particular embodiment of the invention, the glass has a luminous transmittance of at least 55% and a color characterized by a dominant wavelength of 485 to 489 nanometers and an excitation purity of about 3 to 18 percent. In another embodiment of the invention, the glass has a luminous transmittance of at least 65% at a thickness of about 0.154 inches (3.9 mm) and a color characterized by a dominant wavelength of 485 to 492 nanometers and an excitation purity of about 3 to 18 percent.

Shown in Tables 8-12 are a range of glass compositions and approximate batch component ranges with $SnO_2$ and graphite compositions and approximate batch component ranges with $SnO_2$ and graphite to make the high iron, high redox ratio glass of the invention.

Table 8 is a range of glass compositions including $SnO_2$ and excluding graphite, and corresponding batch ingredients to make the glass.

TABLE 8

| Ingredient | Min (lbs) | Max (lbs) |  | Minimum wt. % | Maximum wt. % |
|---|---|---|---|---|---|
| sand | 1000 | 1000 | $SiO_2$ | 65.00 | 80.00 |
| soda ash | 200 | 400 | $Na_2O$ | 10.00 | 20.00 |
| limestone | 40 | 100 | CaO | 5.00 | 15.00 |
| dolomite | 100 | 400 | MgO | 0.00 | 8.00 |
| salt cake | 0 | 20 | $SO_3$ | 0.10 | 1.00 |
| $SnO_2$ | 0.07 | 77 | $Fe_2O_3$ | 0.10 | 2.0 |
| graphite | 0 | 8 | $Al_2O_3$ | 0.00 | 5.00 |
| rouge | 0 | 33 | $K_2O$ | 0.00 | 5.00 |
|  |  |  | $SnO_2$ | 0.0050 | 5.0 |

Table 9 is a glass composition and approximate batch ingredient weights without $SnO_2$ and with graphite.

TABLE 9

| Ingredient | lbs. |  | wt. | wt % |
|---|---|---|---|---|
| sand | 1000.00 | $SiO_2$ | 997.50 | 72.83 |
| soda ash | 316.00 | $Na_2O$ | 188.06 | 13.73 |
| limestone | 88.00 | CaO | 120.42 | 8.79 |
| dolomite | 234.00 | MgO | 51.45 | 3.76 |
| salt cake | 9.50 | $SO_3$ | 2.67 | 0.195 |
| graphite | 2 | $Fe_2O_3$ | 6.87 | 0.502 |
| rouge | 6.8 | $Al_2O_3$ | 2.00 | 0.15 |

Table 10 is a preferred glass composition and approximate batch ingredient weights with graphite and $SnO_2$.

TABLE 10

| Ingredient | wt. | | wt. % |
|---|---|---|---|
| sand | 1000.00 | SiO$_2$ | 997.55 | 71.89 |
| soda ash | 320.00 | Na$_2$O | 190.39 | 13.72 |
| limestone | 80.00 | CaO | 117.76 | 8.49 |
| dolomite | 240.00 | MgO | 52.72 | 3.80 |
| salt cake | 9.50 | SO$_3$ | 2.67 | 0.193 |
| SnO$_2$ | 17.42 | Fe$_2$O$_3$ | 6.49 | 0.468 |
| Graphite | 1 | Al$_2$O$_3$ | 2.00 | 0.14 |
| rouge | 6.4 | SnO$_2$ | 17.20 | 1.23 |

Table 11 shows preferred ranges of colorants and/or redox controlling agents.

TABLE 11

| Ingredients | Amount |
|---|---|
| Nd$_2$O$_3$ | 0-0.5 wt % |
| CoO | 0-80 ppm |
| Fe$_2$O$_3$ | 0.1-2.0 wt % |
| Cr$_2$O$_3$ | 0-1 wt % |
| TiO$_2$ | 0-1 wt % |
| CeO$_2$ | 0-1 wt % |
| MnO$_2$ | 0-1 wt % |

The invention contemplates the lower range of all or selected ones of the ingredients of Table 11 to have a lower range of greater than 0.

Shown in Table 12 is an example of a glass composition of the invention and the expected performance.

TABLE 12

| Ingredients | Ingredients in wt. % |
|---|---|
| SiO$_2$ | 71.83 |
| Na$_2$O | 13.94 |
| K$_2$O | 0.07 |
| CaO | 8.73 |
| MgO | 3.8 |
| Al$_2$O$_3$ | 0.07 |
| Fe$_2$O$_3$ | 0.515 |
| SrO | 0.003 |
| SO$_3$ | 0.18 |
| ZrO$_2$ | 0.0012 |
| FeO/Fe$_2$O$_3$ | 0.559 |
| SnO$_2$ | 0.828 |

The glass sample in Table 12 had an LTA of at least 65.19%; a dominant wavelength in the range of 485-490 nanometers, e.g. 487.95 nanometers; an excitation purity in the range of 10-15%, e.g. 13.13%; a TSUV in the range 45-50%, e.g. 48.46%; a TSIR in the range of 7-9%, e.g. 8.25% and a TSET in the range of 32-36%, e.g. 34.59% at a thickness of 5.6 mm. Similar samples are expected to have a redox of greater than 0.35 up to about 0.60, a luminous transmittance of at least 55 percent, and a color characterized by a dominant wavelength of 485 to 489 nanometers and an excitation purity of about 3 to 18 percent, and wherein the glass has a total solar ultraviolet transmittance of about 60 percent or less, a total solar infrared transmittance of about 35 percent or less and a total solar energy transmittance of about 55 percent or less at a thickness of about 0.154 inches.

As can be appreciated, the invention is not limited to the non-limited embodiments of the invention disclosed herein and the invention can be practiced on glasses having medium wt. % of total iron, e.g. greater than 0.02 to less than 0.10 wt %, and having redox ratio less than 0.2 to 0.6.

Figure 9:
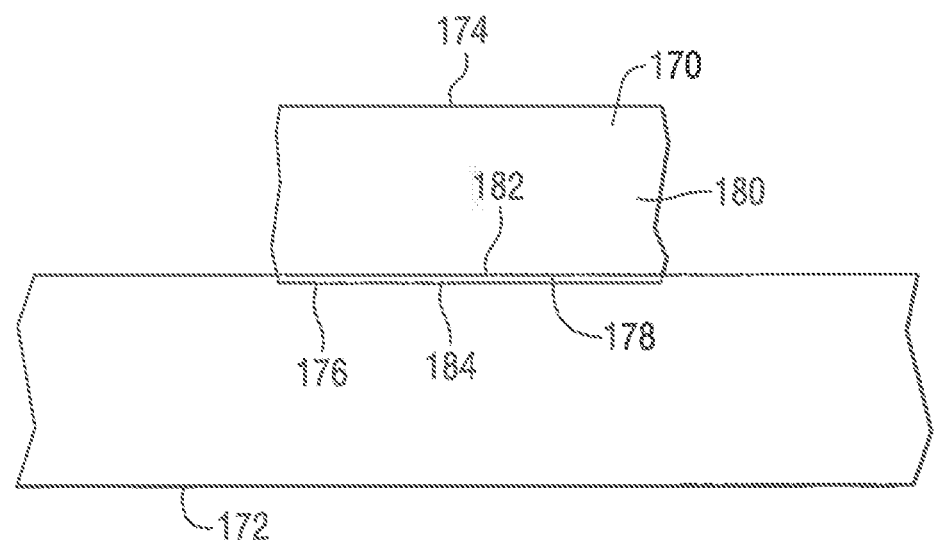
FIG. 9 is a fragmented side view of a glass ribbon supported on a molten tin bath.

With reference to FIG. 9, as can be appreciated by those skilled in the art, the glass of the invention made using the float process, which includes supporting and advancing a glass ribbon 170 on a molten tin bath 172 while controllably cooling and applying forces to the glass ribbon 170 has an air side 174 and an opposite tin side 176. The tin side 176 is the side of the glass ribbon 170 supported on the molten tin bath 172. The tin dioxide concentration generally is higher at the tin side 176 (tin dioxide concentration at the tin side 172 designated by the number 178) of the glass ribbon 170 than the tin dioxide concentration in body portion 180 of the glass ribbon 170. A reason for the difference in tin concentration is that the tin dioxide concentration 178 at the tin side 176 of the glass ribbon 170 includes the tin added to the batch and/or molten glass to maintain a high redox ratio for the glass ribbon 170 and the tin from the tin bath 172 that diffuses into the tin side 176 of the glass ribbon 170 as discussed above; whereas, the tin concentration in the body portion 180 of the glass ribbon is the tin dioxide added to the batch and/or molten glass to maintain a high redox ratio for the glass ribbon 170. As can be appreciated the transition between the tin dioxide concentration at the tin side 176 and the tin concentration in the body portion 180 is shown in FIG. 9 as a straight line 182 for purposes of clarity; however, the transition 182 is not a straight line but a gradual transition having decreasing concentration of tin as the distance from the surface 184 of the tin side increases. Further as the thickness of the glass ribbon increases, the thickness of the tin dioxide concentration at the tin side of the glass ribbon can increase. As can now be appreciated, the addition of tin and/or tin containing compounds may result in tin being extracted from the tin side of the ribbon resulting in the concentration of the tin ions at the tin side of the ribbon being equal to or less than the tin ions in the air side of the glass ribbon.

It will be readily appreciated by those skilled in the art that modifications can be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A glass, comprising:
 a basic soda-lime-silica glass portion, wherein the basic soda-lime-silica glass portion comprises:

| | |
|---|---|
| SiO$_2$ | 65-80 wt. % |
| Na$_2$O | 10-20 wt. % |
| CaO | 5-15 wt. % |
| MgO | 0-8 wt. % |
| Al$_2$O$_3$ | 0-5 wt. % |
| K$_2$O | 0-5 wt. %; | a colorant portion, the colorant portion comprising CoO and/or Nd$_2$O$_3$,
 total iron as Fe$_2$O$_3$ in the range of greater than zero to 0.02 weight percent;
 a redox ratio in the range of 0.35 to 0.6, and
 tin metal providing tin in an amount within the range of greater than 0.005 to 5.0 weight percent;
 the glass product has an LTA of greater than or equal to 85%; a dominant wavelength in the range of 480 to 510 nanometers; an excitation purity in the range of 0.10 to 0.15%; a TSUV in the range of 85 to 90%; a TSIR in the range of 85 to 90% and a TSET in the range of 87 to 91% at a thickness of 5.6 mm, and wherein the glass product has a melting temperature of at most 2650° F., and wherein the glass product has a tin side and an opposite air side, said tin side of the glass having a higher concentration of tin than the air side, the air side having a uniform concentration of tin from the air side of the glass product towards the tin side of the glass product.

2. The glass according to claim 1 wherein the glass comprises:

| Ingredient | Ingredient in wt. % |
|---|---|
| $SiO_2$ | 73.11 |
| $Na_2O$ | 13.65 |
| $K_2O$ | 0.01 |
| CaO | 8.68 |
| MgO | 3.16 |
| $Al_2O_3$ | 0.03 |
| $Fe_2O$ | 0.0097 |
| SrO | 0.02 |
| $SO_3$ | 0.2 |
| $ZrO_2$ | 0.001 |
| $FeO/Fe_2O_3$ | 0.505 |
| $SnO_2$ | 0.111. |

3. The glass according to claim 1 wherein the tin metal at the air side has a concentration of tin in the range of greater than 0.005 to 5.0 weight percent.

4. The glass according to claim 1, wherein the amount of the tin metal is in the range of greater than 0.015 to 0.58 weight percent.

5. The glass according to claim 1, wherein the amount of tin metal is in the range of greater than 0.1 to less than or equal to 0.2 weight percent.

6. The glass according to claim 1, wherein the amount of the tin metal is in the range of 0.4 to 3 weight percent.

7. The glass according to claim 1, wherein the glass comprises tin oxide in the range of greater than 0 to 0.70 weight percent.

8. The glass according to claim 1 wherein the glass batch has a redox ratio in the range of greater than 0.35 up to 0.60.

9. The glass according to claim 1, wherein the colorant comprises greater than 0 to 0.1 $Nd_2O_3$; greater than 0 to 40 ppm CoO; greater than 0 to 0.05 weight percent $Cr_2O_3$; greater than 0 to 0.05 weight percent $TiO_2$; greater than 0 to 1 weight percent $CeO_2$, or greater than 0 to 1 weight percent $MnO_2$.

10. The glass according to claim 1, further comprising graphite in the range of greater than zero to 0.15 weight percent.

11. The glass according to claim 1, wherein the glass has an LTA of at least 91.23%; a dominant wavelength of 496.66 nanometers; an excitation purity of 0.14%; a TSUV of 89.07%; a TSIR of 87.82% and a TSET of 89.43% at a thickness of 5.6 mm.

12. The glass according to claim 1, wherein the glass has water in the range of 200 to 700 parts per million.

* * * * *

UNITED STATES PATENT AND TRADEMARK OFFICE
CERTIFICATE OF CORRECTION

PATENT NO. : 10,737,970 B2
APPLICATION NO. : 15/046938
DATED : August 11, 2020
INVENTOR(S) : Mark O. Naylor et al.

It is certified that error appears in the above-identified patent and that said Letters Patent is hereby corrected as shown below:

On the Title Page

Column 2, item (56) OTHER PUBLICATIONS, Line 4, delete "Mikrochimica" and insert -- Microchimica --

In the Claims

Column 19, Line 20, Claim 2, delete "$A_{l2}O_3$" and insert -- $Al_2O_3$ --

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*